July 7, 1959   H. A. BARBER ET AL   2,893,602
APPARATUS FOR MEASURING AGGREGATE FOR MIXTURE WITH ASPHALT
Filed Sept. 9, 1955   5 Sheets-Sheet 1

INVENTORS
HARRY A. BARBER
JAMES F. SAUER
BY ROY C. HEACOCK
ATTORNEYS

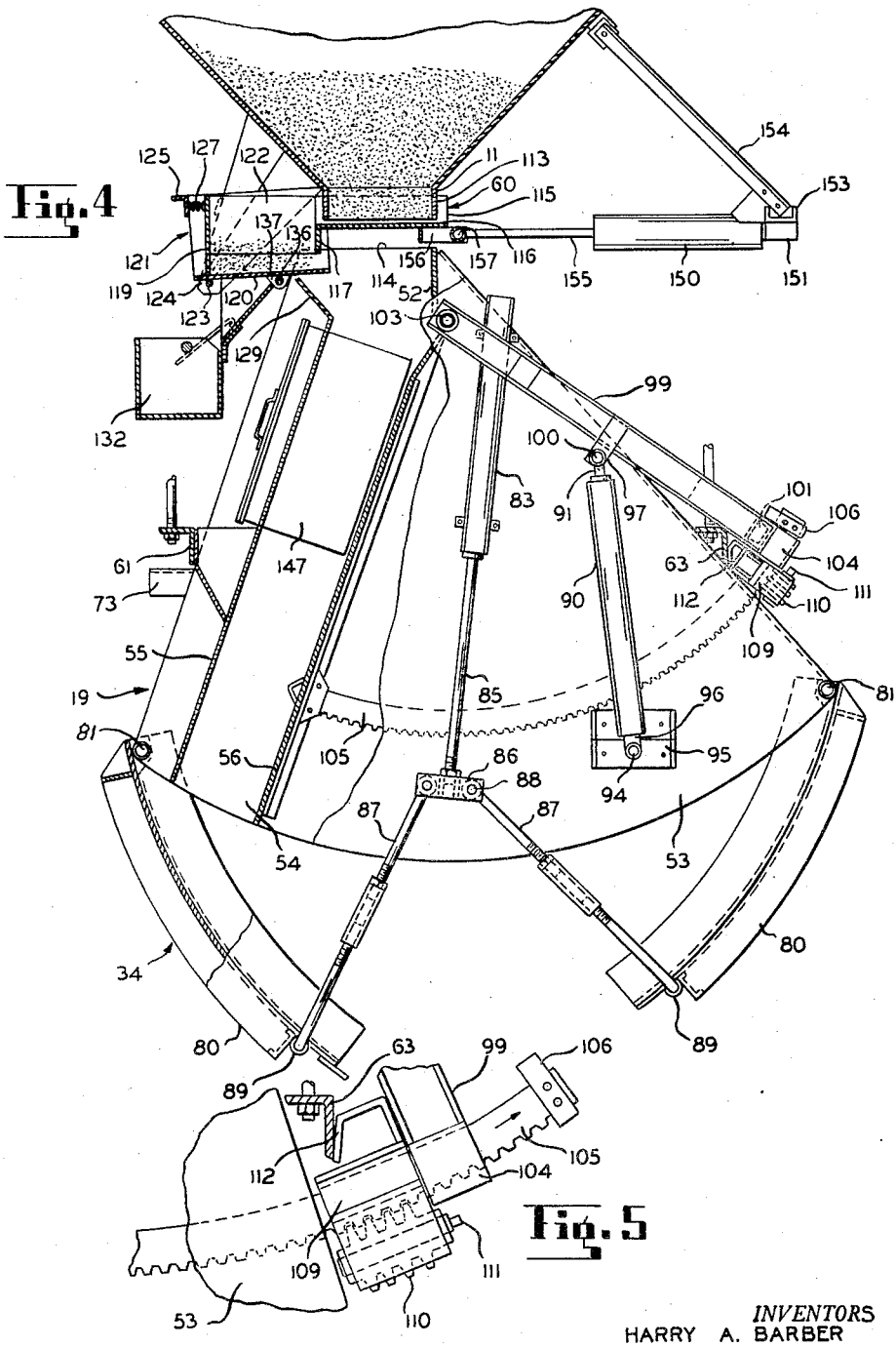

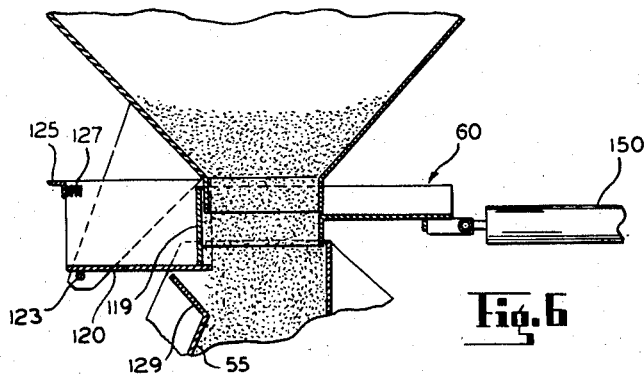
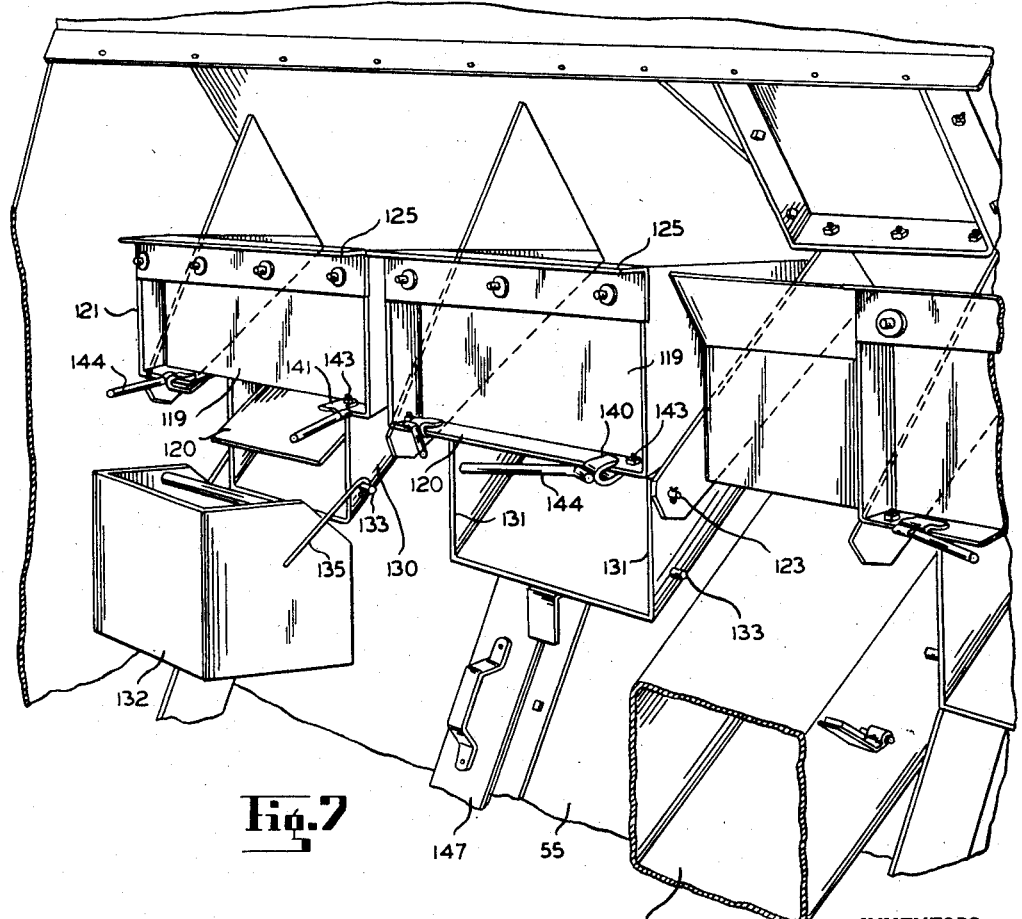

United States Patent Office 2,893,602
Patented July 7, 1959

2,893,602
APPARATUS FOR MEASURING AGGREGATE FOR MIXTURE WITH ASPHALT

Harry A. Barber, James F. Sauer, and Roy C. Heacock, Aurora, Ill., assignors to Barber-Greene Company, Aurora, Ill., a corporation of Illinois Application September 9, 1955, Serial No. 533,284

16 Claims. (Cl. 222—77)

This invention relates to a batch asphalt plant and more particularly relates to an improved method and apparatus for measuring aggregate for mixture with asphalt.

A principal object of the invention is to provide a novel and improved method and apparatus for measuring aggregate for batch mixing with asphalt.

Another object of the invention is to provide a novel and improved form of asphalt plant for mixing and delivering asphalt in batches and adapted for manual or automatic operation as desired.

A further object of the invention is to provide a simplified form of apparatus and method for measuring aggregate for mixing with asphalt by filling a bin of a required volume and striking off the aggregate in the bin.

A further object of the invention is to provide a simplified form of storage and measuring means for aggregate in which a predetermined volume of aggregate flowing from a supply bin is struck off and in which the strike-off means for the aggregate also serves as a sample collecting means therefor.

A still further object of the invention is to provide an aggregate supply and measuring or weighing means particularly adapted for a batch asphalt plant and supplying a predetermined weight or volume of aggregate for mixture with asphalt, in which an aggregate supply bin is carried over an aggregate measuring bin, and in which a strike-off gate forms a communicating passageway between the bin and strikes off material in the measuring bin when full and blocks the supply of aggregate thereto to assure a uniform volume of aggregate in the measuring or weighing bin.

Still another object of the invention is to provide an aggregate supply and measuring means for supplying aggregate for mixture with bitumen or asphalt for a bituminous batch plant in which varying sizes of aggregate are contained in aggregate storage bins arranged one beside the other, in which a weigh hopper supported on a scale and separated into compartments in accordance with the required number of aggregate supply bins, is arranged in material receiving relation with respect to the supply bins, for receiving aggregate therefrom, and in which strike-off gates strike off a predetermined volume of aggregate in the aggregate supply bins in accordance with the weight thereof for the first measuring operation, and then measure the aggregate by striking off a predetermined volume of aggregate in the aggregate measuring bins for the next succeeding measuring operations.

A still further object of the invention is to provide an an aggregate measuring bin having a movable side wall for adjusting the volume of the bin at will and supported on scale beams to measure a required weight of aggregate, and so arranged that during the weighing operation the volume of the bin may be varied in accordance with a required weight of aggregate, and after the weighing operation aggregate may be measured by striking off the material supplied to the bin from the top thereof.

Still a further object of the invention is to provide a novel and improved form of strike-off gate forming a communicating passageway between a supply and measuring bin, striking off aggregate on the measuring bin at the level of the top thereof and also providing a sample of aggregate for sampling during the strike-off operation.

A still further object of the invention is to provide a novel and improved asphalt batch plant having a plurality of storage bins arranged in side-by-side relation with respect to each other for storing the required sizes of aggregate, a plurality of adjustable volume aggregate bins in material receiving relation with respect to the storage bins and so constructed and arranged that after an initial weighing operation the next succeeding measuring operations may be either manual or automatic, as desired.

These and other objects of the invention will appear from time to time as the following specification proceeds and with reference to the accompanying drawings wherein:

Figure 4 is a fragmentary transverse vertical sectional view taken through one of the bins of the aggregate weigh hopper and showing the strike-off in a strike-off position with respect to the aggregate supply bin;

Figure 5 is an enlarged fragmentary detail view illustrating the stop means for the adjustable wall of one of the aggregate measuring bins for adjusting the wall of the measuring bin to the required volume with certain parts shown in vertical section;

Figure 1:
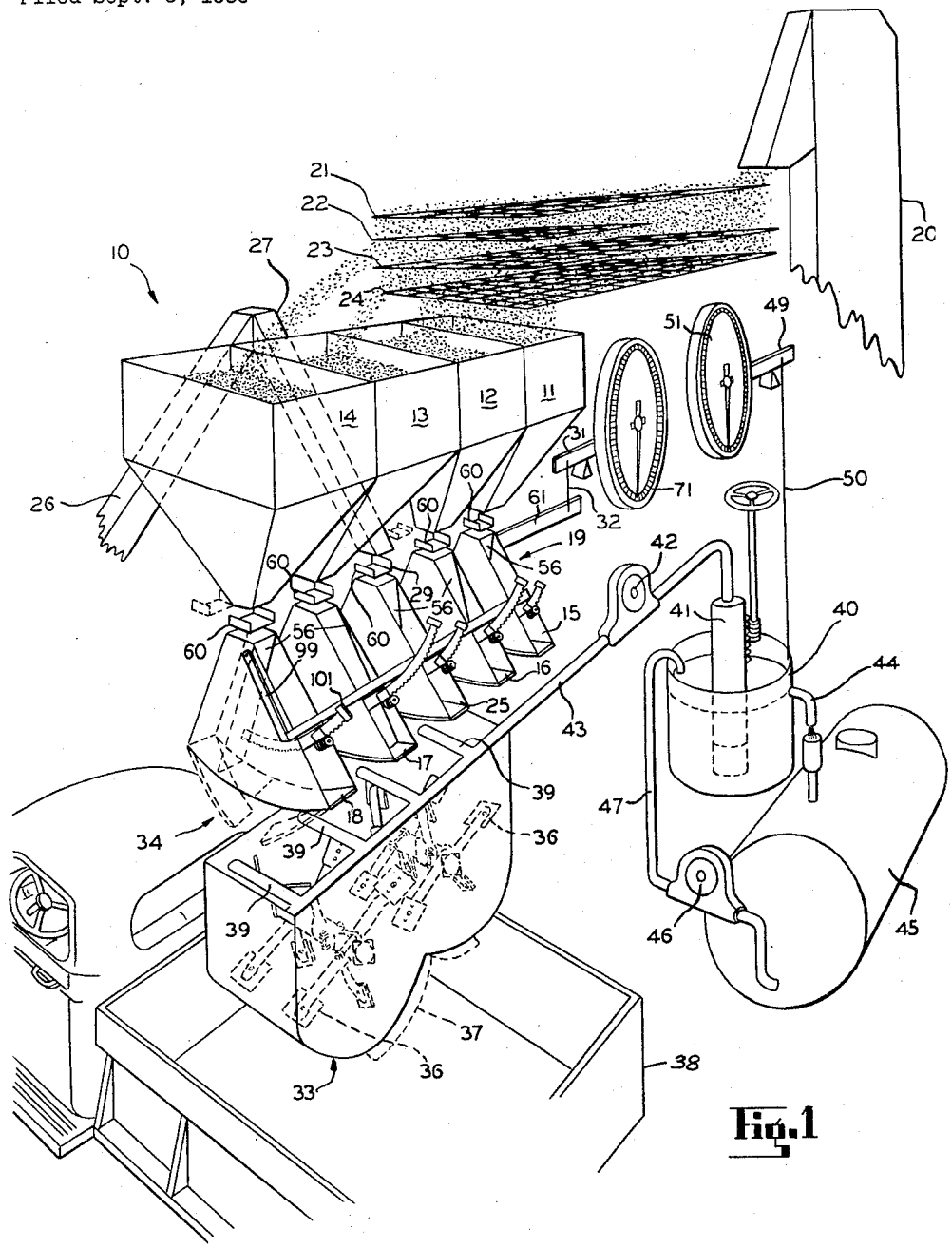
Figure 1 is a diagrammatic view of an asphalt batch plant having an aggregate supply and measuring means constructed in accordance with the invention embodied therein.

Figure 6 is a fragmentary vertical sectional view taken through one of the aggregate supply bins and measuring bins and somewhat similar to Figure 4 but showing the strike-off gate in its open position to form a duct between a supply bin and an associated measuring bin; and Figure 7 is an enlarged fragmentary perspective view looking at the supply bins and the weigh hopper from the sampling side thereof and showing a sampling box in material receiving relation with respect to a strike-off gate and retaining box therefor.

In the embodiment of our invention illustrated in the drawings, we have shown in Figures 1 and 2 a bituminous batch plant 10 including generally a plurality of storage bins 11, 12, 13 and 14 of a hopper-like form converging toward the lower ends thereof, for discharging aggregate into a plurality of aligned aggregate measuring bins 15, 16, 17 and 18 carried in a drop bottom weigh hopper 19, as will hereinafter more clearly appear as this specification proceeds.

Dried aggregate may be supplied to the storage bins 11, 12, 13, and 14 directly from an aggregate drier (not shown) by means of an elevator 20, which may be a bucket elevator and discharges the dried aggregate directly onto sizing screens 21, 22, 23, and 24, one sizing screen being provided for each supply or storage bin 11, 12, 13, and 14 to supply the properly sized aggregate thereto in a manner well known to those skilled in the art and no part of our present invention so not herein shown or described further.

The weigh hopper 19 also contains a bin 25 for mineral fines, herein shown as being positioned between the bins 16 and 17 and receiving mineral fines supplied by an elevator 26 discharging into a supply or storage chute 27 in direct communication with the bin 25 through a sliding gate 29.

The weigh hopper 19 is divided into a series of aggregate measuring compartments or bins 15, 16, 25, 17 and 18 and is supported on spaced beams 61 and 63, connected with a scale lever 31 through a linkage and lever arrangement 32 for indicating the weight of the aggregate and mineral fines contained in the weigh hopper for mixture with asphalt in a pug mill 33. The weigh hopper 19 is provided with a clam shell discharge gate indicated generally by reference character 34, for simultaneously discharging aggregate from all of the bins in said weigh hopper.

The pug mill 33 is shown as having a plurality of spaced paddles 36 therein, power driven to rotate toward each other, and as having a sliding discharge gate 37 slidable to discharge the mixed aggregate, mineral fines and asphalt into a truck 38. The pug mill 33 is no part of our invention so need not herein be shown or described further.

Asphalt is supplied to the pug mill for mixture with the aggregate and mineral fines by means of spray bars or pipes 39 extending across said pug mill and supplied with hot asphalt from a measuring tank 40 through a suction pipe 41, pump 42 and discharge pipe 43 having the spray bars or pipes 39 extending therefrom in parallel relation with respect to each other, for spraying asphalt for mixture with the aggregate and mineral fines discharged into the pug mill.

The measuring tank 40 has an overflow return 44 for returning excess asphalt to an asphalt supply tank 45. Asphalt is supplied to the measuring tank 40 by means of a pump 46 connected to its suction end with the asphalt supply tank 45 near the bottom thereof and connected at its discharge end with an asphalt fill pipe 47 having a discharge end arranged in asphalt supply relation with respect to the asphalt measuring tank 40.

The asphalt measuring tank 40 is supported on a scale lever 49 through a linkage arrangement diagrammatically illustrated and generally designated by reference character 50. The suction pipe 41 is adjustable and may be preset to control the amount of asphalt pumped from the measuring tank 40 for each batch of asphalt. The scale lever 49 is diagrammatically shown as being connected with a scale 51, which indicates the amount of asphalt pumped out of the weigh bucket.

Figure 2:
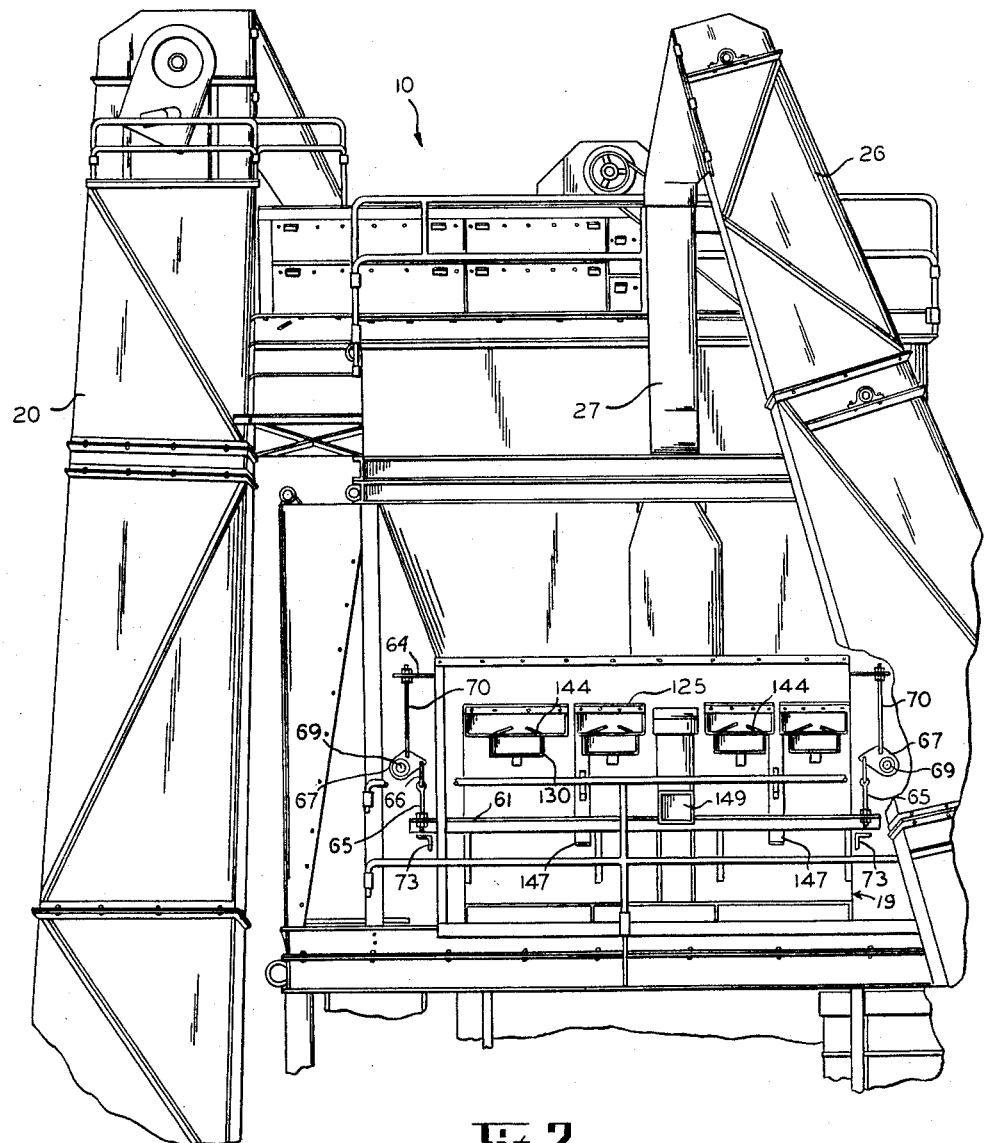
Figure 2 is a fragmentary side view of the batch plant diagrammatically shown in Figure 1 illustrating the scale beams supporting an aggregate weigh hopper constructed in accordance with our invention and looking at the weigh hopper toward the sampling side thereof.

Thus far, we have generally shown and described in Figures 1 and 2, a batch asphalt plant in which dried hot aggregate is screened and sized and delivered to a plurality of storage or supply bins in accordance with the size thereof and arranged in material discharge relation with respect to a common weigh hopper partitioned to form a plurality of measuring bins, one in association with each storage bin, and a mineral fines bin, the volume of all of which bins may be varied in accordance with the weight of aggregate and fines required for a mixture with a given measured volume of asphalt in the pug mill.

We have further shown a batch asphalt plant in which the aggregate and fines may be weighed for each batch if required, or in which the aggregate and fines for one batch may first be weighed, the volume of the bins of the weigh hopper being adjusted in accordance with the weight of aggregate required and once being adjusted, a given weight of aggregate may be delivered merely by striking off the aggregate in the aggregate measuring bins.

It may further be seen that the volume of asphalt delivered may be weighed, and the suction pipe 41 in the asphalt measuring tank may be adjusted in accordance with a required weight of asphalt and set to maintain a uniform delivery volume of asphalt for mixture with each batch of aggregate in the pug mill 33.

It may be seen that the batch asphalt plant and system of our invention may readily be adapted to manual or automatic operation and that when the weight of the aggregate and fines, as well as the weight of asphalt has once been determined, that the next succeeding mixes of aggregate, mineral fines and asphalt may automatically be delivered, and that the system of our invention is particularly adapted for either automatic or manual operation and accommodates the mix to be readily varied, as required.

Referring now in particular to the aggregate storage or supply bins, the weigh hopper therefor and the individual measuring bins carried thereby and the system of measuring and delivering a required weigh of aggregate for mixture with a given weight of asphalt, the weigh hopper 19 is shown as being generally triangular in form with the apex or small part of the hopper in direct association with the reduced cross-sectional area discharge ends of the supply or storage bins 11, 12, 13, and 14.

As herein shown the weigh hopper 19 has parallel end walls 53 and a plurality of partitions 54 spaced therebetween in parallel relation with respect to each other, to form the aggregate measuring compartments or bins 15, 16, 17, 18, and 25.

The weigh hopper also has an inclined side wall 55 extending thereacross along one side thereof which may be referred to as the sampling side thereof.

Figure 3:
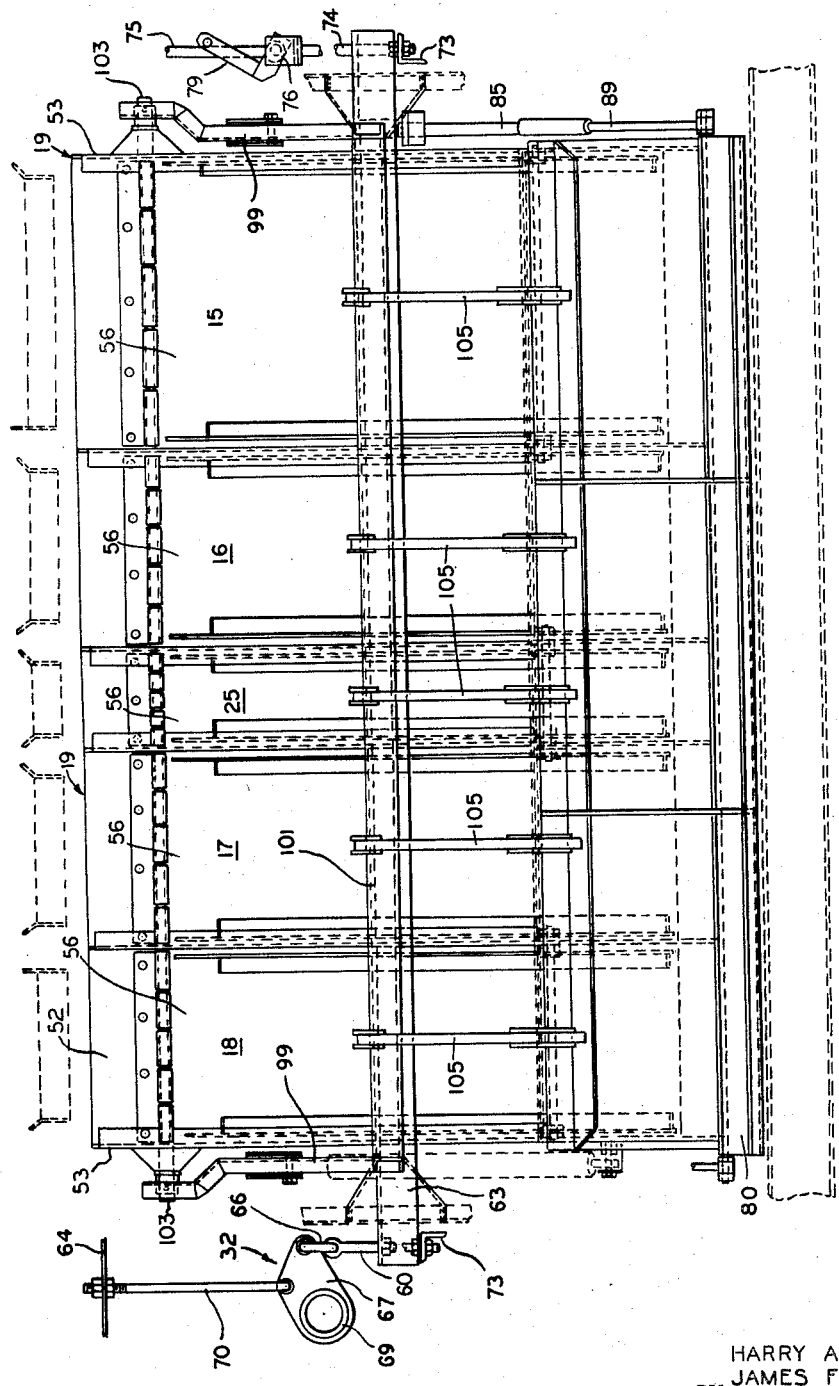
Figure 3 is an enlarged side view of the aggregate weigh hopper looking at the hopper from the opposite side thereof than in Figure 2 and showing certain parts broken away.

Between the outer walls 53 and the next adjacent partitions 54 and between the intermediate partitions 54 are generally vertical walls 52 extending downwardly from the top of the weigh hopper a short distance, and adjustable side walls 56 hinged thereto. As herein shown, the side walls 56 interleave the walls 52 at their upper ends and are pivotally connected thereto as by a hinge pin 59, extending the length of the weigh hopper 19. It should also be noted in Figure 3 that the widths of the walls 56 vary, depending upon the width of the respective aggregate measuring bin. The same reference characters, therefore, will be used to designate each side wall and operating mechanism therefor, since the construction and operation of all of the side walls is the same.

In association with each measuring bin 15, 16, 17 and 18 is a strike-off gate 60 serving as a conduit to conduct aggregate to each measuring bin from an associated storage bin and also serving to strike off the aggregate from the top of an associated measuring bin and to block the flow of aggregate from a storage or supply bin to the associated measuring bin.

The weigh hopper 19 is shown in Figure 4 as having a beam in the form of an angle 61 extending along the side wall 55 beyond the opposite end walls 53 and welded or otherwise secured to said side wall and end walls. A similar beam 63 extends along the opposite side of the weigh hopper 19 from the beam 61 and is welded or otherwise secured to the end walls 53. The beams 61 and 63 extend beyond opposite ends of the weigh hopper 19 and are suspended from parallel spaced beams 64, through the scale linkages 32. The scale linkages 32 include a link 65 secured to and extending upwardly from each end of each beam 61 and 63. Each link 65 is connected through a pivoted link 66 to a rocking arm 67 on a torsion shaft 69. A link 70 is connected to the rocking arm 67 inwardly or closer to the pivot of the rock shaft 69 than the links 65 and 66, and is bolted or otherwise secured to the support beam 64. The torsion bars 69 are operatively associated with a dial 71 of the scale unit to indicate the weight of aggregate and fines in the weigh hopper 19 through the scale lever diagrammatically indicated by reference character 31 and diagrammatically shown in Figure 1. The scale linkage and leverage arrangement, therefore, may be of any well known form and forms no part of our present invention, so is not herein shown or described in detail.

Two spaced beams 73 are shown as extending along each end of the weigh hopper 19 in outwardly spaced relation with respect thereto beneath the beams 62 and 63 for taking the weight from the scale when desired. As herein shown each beam 73 is supported at its ends on vertically extending hanger bolts 74 bolted or otherwise secured to opposite ends thereof.

The bolts 74 are suspended from aligned hanger bolts 75 through adjustable yoke and cam connections 76, each being operated by an individual lever arm 79. The hanger bolts 75 are suspended from the stationary framework for the batch plant. When the lever arms 79 are in the upright positions shown in Figure 3, the beams 62 and 63 will be supported on the beams 73 to relieve the weight of the weigh hopper 19 and the aggregate and fines therein from the scale. When, however, the lever arms 79 are pivoted in a clockwise direction, the adjustable cam and yoke connection 76 will lengthen the links formed by the hanger bolts 74 and free the beams 73 from the beams 62 and 63 and accommodate the weighing of the aggregate by the scale.

The clam shell discharge gate 34 includes two gate members 80 extending across the bottom of the weigh hopper and pivoted to opposite lower sides thereof on pivot shafts 81. The discharge gate 34 is operated by hydraulic cylinders 83 extending in a generally vertical direction and secured to opposite end plates 53 of the weigh hopper. Each of said cylinders has a piston rod 85 extensible therefrom having a yoke 86 secured to its lower end and extending outwardly therefrom in opposite directions. Adjustable rods or links 87 are pivoted to opposite ends of the yoke 86 on pivot pins 88 and have pivotal connection with pivot lugs 89 recessed inwardly from the outer inner end portions of the gate members 80 to close said gate members upon retractible movement of the piston rod 85 within the cylinder 83, as fluid under pressure is supplied to the piston rod end of said cylinder.

The movable walls 56 of the measuring bins or compartments of the weigh hopper 19 are opened by operation of hydraulic cylinders 90 and piston rods 91 extensible therefrom. A cylinder 90 is pivotally mounted on each end wall 53, as by a pivot pin 94 carried in a support bracket 95 secured to the wall 53 and extending through a lug 96 extending downwardly from the head end of the cylinder 90.

Each piston rod 91 is pivotally connected at its upper end to a bracket member 97 secured to and extending downwardly from an arm 99 intermediate the ends thereof. A pivot pin 100 connects the piston rod to said coupling member.

The arms 99 are connected together by a transverse arm 101 which may be formed integrally therewith and are pivoted to the end walls 53 adjacent the upper ends thereof on pivot pins 103. The transverse arm 101 has a plurality of transverse straps 104 secured to and extending rearwardly therefrom and forming slidable guides for arcuate racks 105. Each arcuate rack 105 is secured to a pivoted wall 56 adjacent the lower end thereof and has a stop 106 secured to its outer end, which when engaged by the strap 104 upon upward pivotal movement of the arm 101, pivots the walls 56 outwardly with respect to the walls 55.

Thus upon the admission of fluid under pressure to the head ends of the cylinders 90, the arms 99 and transverse arm 101 will move upwardly about the axis of the pivot pins 103 into engagement with the stops 104 to move all of the walls 56 to their wide open positions.

A means is provided on each rack 105 to limit the amount of closing movement of each pivoted wall 56 and thus to retain a desired measuring bin or compartment to the size required to contain aggregate of a predetermined weight or volume. As herein shown, each rack 105 has a worm housing 109 slidably guided thereon and forming a stop for its associated pivoted wall. A worm 110 is journaled in said worm housing and meshes with the teeth of the rack 105. The worm 110 has an irregular or squared projecting end portion or shaft 111 projecting from the worm housing 109, which is adapted to be engaged by a crank or wrench for varying the position of the worm housing 109 with respect to the rack 110. The worm housing 109 is shown as having an abutment member 112, extending inwardly therefrom at the angle of the horizontal leg of the beam 63 for engagement therewith, to limit movement of the rack 105 and its associated gate 56 in a closing direction.

When the worm housing 109 is in the position shown in Figure 4, the associated wall 56 is in its fullest closed position and the bin associated therewith will be in its most restricted condition. As, however, the worm 110 is rotated to move the rack 115 outwardly along the worm housing 109 toward the pivoted wall 56, as for example to the position shown in Figure 5, the volume of the respective bin will be increased in an obvious manner.

It may thus be seen that each side wall of the five compartments of the weigh hopper may be individually set. For example, when the weigh hopper is empty the scale may be set to read "zero" with the strike-off gates 60 closed. The strike-off gate of one compartment may then be opened to fill the same and when filled the gate may again be closed, allowing the weigh hopper to hang free on the scale. The scale reading may then be read. If the scale reading is too low the pivoted wall 56 may be moved outwardly by operation of the worm 110 and as the aggregate settles, the strike-off gate may again be opened to fill the added compartment or bin space. The strike-off gate may again be closed. If the weight is correct the compartment or bin will be correctly set for the required volumetric capacity for a predetermined weight of aggegate and the compartment may be emptied and refilled without further weighing.

This operation may be repeated for each bin or compartment if necessary, to provide the required sizes and mixture of aggregate and the required volume of mineral fines for mixing with the asphalt in the pug mill 33.

Referring now to the strike-off gates 60 and the method of striking off the aggregate in the respective aggregate bins and providing aggregate for sampling, the strike-off gates 60 are slidably guided for movement transversely of the weigh hopper 19 along the top thereof in the space between a rectangular reduced cross-sectional area discharge end portion 113 of a supply bin, and a receiving end portion 114 of an associated measuring bin of the weigh hopper 19. The discharge end portions of the supply bins will be designated by the same reference characters since the supply bins are each of a similar construction.

As herein shown each strike-off gate 60 has parallel spaced side walls 115 slidably extending along opposite sides of a discharge end portion 113 of an associated aggregate supply or storage bin and has a flat plate portion 116 extending between said side walls for a portion of the length thereof and movable beneath the discharge end portion 113 of the associated supply bin, for blocking the flow of material from said supply bin into an associated measuring bin or compartment. The plate portion 116 terminates at its forward end in a depending wall extending between the side walls 115 and forming a strike-off blade 117, for striking off aggregate from the top of an associated measuring bin or compartment.

Spaced in advance of the strike-off blade 117 a distance slightly greater than the width of the discharge portion 113 of the associated supply bin and connected between the side plates 115 is a scraper blade 119 extending downwardly beneath the side walls 115 and scraping aggregate along a tiltable bottom 120 of a tiltable aggregate collecting box 121 and hereinafter referred to as a tilt box. The tilt box 121 is shown as having parallel spaced side walls 122 extending along the outer sides of the side walls 115 of the strike-off gate 60 and forming a guide therefor. Said tilt box is pivoted adjacent its forward end on a transverse pivot pin 123 connected between spaced support arms 124 extending downwardly and outwardly from the associated supply or storage bin and spacing the pivot pin 123 well in advance of the wall 55 of the weigh hopper 19. The side walls 122 are connected together adjacent their outer ends by a transverse angle 125.

Compression springs 127 are suitably secured to the inner face of the vertical leg of the transverse angle 125 and extend inwardly therefrom for engagement with the top portion of the outer side of the scraper blade 119, to effect tilting of the tilt box at a slight angle as a respective measuring bin is struck off.

It will be noted from Figure 6, showing the strike-off gate 60 in its open position, that as the respective measuring bin is struck off, the scraper blade 119 will scrape any loose aggregate that may be on the tiltable bottom 120 of the tilt box beyond the end thereof, and will also engage the compression springs 127 and tilt the tilt box 121 about the axis of the pivot pin 123.

Beneath each tilt box 121 is a chute 130 having opposite side walls 131 extending along opposite sides of the tiltable bottom plate 120 and with said bottom plate forming a chute for discharging aggregate into a detachable sampling box 132. The sampling box 132 is shown as being hooked to pins 133 extending outwardly from the side walls 131 by rods 135 pivoted to opposite side walls of a sampling box 131. The free end portions of the rods 135 are shown as having their outer end portions bent in the form of open hooks to hook over the pins 133 and support the sampling box thereon.

The tilting bottom 120 of each tilt box is shown as being pivoted thereto on a transverse rod 136 extending through spaced ears 137, depending from said bottom and extending through corresponding ears (not shown) depending from the side of the walls 121.

The tiltable bottom 120 is detachably maintained in its upwardly extended position shown in Figures 4 and 6 by latch devices 140. Each latch device 140 is of a generally U-shaped formation and is pivoted on a horizontally extending inturned end 141 of a side of the tilt box 121 as by a nut and bolt 143. The latch devices 140 have arms 144 secured thereto at the base of the U and extending outwardly therefrom. Thus, as the arms 144 are pivoted outwardly, the tiltable bottom of the tilt box will be released to drop to the position shown in Figure 7, showing the first tilt box with its bottom dropped to discharge aggregate into the sampling box 132.

Thus, as a measuring bin is struck off by the strike-off gate, the strike-off blade striking off the aggregate from the top of the measuring bin or an intermediate section of aggregate between a supply bin and associated measuring bin will transfer the aggregate to the tiltable bottom plate 120, the scraper blade 119 scraping any loose aggregate from said tiltable bottom plate prior to the depositing of aggregate for sampling thereon. The arms 144 may then be moved outwardly to release the tiltable bottom plate 120 and accommodate the aggregate to slide downwardly therealong between the side walls 130 into the sampling box 132. The sampling box may then be removed from the pins 133 with the aggregate sample.

It may thus be seen that an extremely simple means has been provided for taking an accurate sample from a representative section of the aggregate as the aggregate is struck off at the termination of a measuring or weighing operation.

A sliding plate or door 147 is shown as being slidably guided in a partition 54 between two measuring bins, to enable adjacent measuring bins to be combined. While only one sliding door is herein shown, it is obvious that a sliding gate may be provided in each partition if desired to provide various bin combinations.

It will be noted from Figures 2 and 7 that the third bin from the left hand end of the weigh hopper, which is the bin or compartment 25 (Figure 1), has no provision for sampling and has an overflow chute 149 leading therefrom. The chute 149 is provided to carry the fines overflowing the bin 25 back to a mineral fines storage bin (not shown).

Each strike-off gate 60 is operated by an individual fluid pressure cylinder 150 (see Figures 4 and 6). Each cylinder 150 is carried at its head end on a bracket 151 carried on a transverse beam 153, herein shown as being a channel with the flanges thereof facing upwardly. The channel 153 is braced by diagonal struts 154 secured to the walls of the supply bins and extending downwardly and outwardly therefrom. Each cylinder 150 has a piston rod 155 extensible therefrom, upon the supply of fluid under pressure to the head end thereof. The piston rod 155 is pivotally connected to a bracket 156 extending rearwardly from the bottom of the plate 118 as by pivot pins 157. The cylinder 150 may be a double acting cylinder to move the strike-off gate 60 to the open position shown in Figure 6 upon the admission of fluid under pressure to the piston rod end thereof and to the closed position shown in Figure 4 upon the admission of fluid under pressure to the head end thereof.

The release and supply of fluid under pressure to the head and piston rod ends of the cylinders 150 may be under the control of suitable valves (not shown) which may be operated by a cyclic control to supply fluid under pressure thereto simultaneously to operate all of the strike-off gates 60 at the same time when automatically operating the batch plant, or which valves may be manually operated independently of each other to supply fluid under pressure to said strike-off gates individually as required, when initially weighing the aggregate and mineral fines in each bin and adjusting the bins to the correct volumetric capacity for definite weights of aggregate as required and when operating the plant manually. The cylinders 83 may likewise be supplied with fluid under pressure under the control of suitable valves (not shown) which may be operated by a cyclic control mechanism or which may be manually operated at the selection of the operator if desired.

In operation of the plant just described, the aggregate stored in the storage bins 11, 12, 13 and 14 may initially be weighed in the respective measuring bins 15, 16, 17 and 18 of the weigh hopper 19 by striking off the aggregate in said bins, either individually or simultaneously, depending upon the proportions of aggregate desired. When the aggregate has once been struck off from its measuring bin and the respective strike-off gate 60 is closed, the aggregate in the bin may be weighed. If the weight is insufficient, the movable side wall 56 of the respective bin may be moved outwardly by operation of the hydraulic cylinders 90, accommodating the aggregate to settle. The respective strike-off gate may then again be opened to fill the additional space in the bin made by settling of the aggregate and the strike-off gate may again be closed and the aggregate in the bin weighed. This operation may be repeated until the correct weight of aggregate is attained, the extent of opening of the pivoted wall 56 being determined or varied by operation of the worm 110 along the rack 105 as previously described.

When the bins have all been weighed and the pivoted walls 56 have been set for the correct weight of aggregate in the respective bins or compartment, the first batch of aggregate may be discharged into the pug mill 33. At the same time, the spray pump 42, which may be operated under a cyclic control system may be operated to deliver a measured volume of asphalt for mixture with the aggregate.

It should here be understood that during the weighing of the aggregate the mineral fines may also be weighed and that as the mineral fines bin or compartment 25 is filled, the fines will overflow and return to the mineral fines hopper (not shown) through the overflow chute 149. The overflow chute 149 may have a limit switch (not shown) associated therewith operated by a pivoted switch arm 159 on the outside of said chute and actuated by a pivoted vane (not shown) on the inside of said overflow chhte. The vane may move said switch arm 159 into position to close the limit switch (not shown) upon the overflow of fines down the chute to effect operation of the gate 29 to shut off the flow of mineral fines to the mineral fines bin 25, the mineral fines being measured by the overflow thereof from the bin 25 along the overflow chute 149.

Where it is desired to weigh the aggregate manually for each batch, fluid under pressure may be admitted to the head ends of the cylinders 90, pivoting the arms 99 and 101 upwardly and moving the pivoted walls 56 to their wide open positions.

Aggregate may then be admitted to the bins under control of the strike-off gates 60 and during the admission of aggregate thereto, the aggregate may be weighed until the required weight or volume of aggregate is in the respective bins. The mineral fines may be weighed in a similar manner.

Where it is desired to again measure the aggregate volumetrically after once having weighed the aggregate by a series of manual weighing operations, the strike-off gates 60 may be moved to their closed positions and fluid under pressure may be released from the cylinders 90 to accommodate the pivoted walls 56 to be moved inwardly for a trial filling. A strike-off gate 60 may then be opened and an individual compartment may be filled and weighed and the position of the gate may be adjusted as previously described until the compartment is volumetrically adjusted for the required weight of aggregate. This may be repeated for each compartment, including the mineral fines compartment.

The aggregate and mineral fines may then be weighed volumetrically under control of the strike-off gates 60 as previously described.

Furthermore, at any time at the end of a strike-off operation during either volumetric measuring or manual weighing of the aggregate, a sample of aggregate, struck off by the strike-off blade onto the bottom 120 of the tilt box 121 may be taken by hooking a sampling box to the pins 133 and releasing the latches 141 to accommodate the bottom 120 to drop and deposit a sample in the sampling box.

While we have herein shown and described one form in which our invention may be embodied, it should be understood that various modifications and variations thereof may be effected without departing from the spirit and scope thereof.

We claim as our invention:

1. In a bituminous batch plant, aggregate supply and measuring means therefor comprising an aggregate supply bin and an aggregate measuring bin spaced therebeneath in material receiving relation with respect thereto, a strike-off gate movable transversely of said bins in the space therebetween a material receiving box carried by said bins and forming a guide for said strike-off gate and having said strike-off gate movable therealong, said strike-off gate having an open duct like portion in the space between said bins and forming a duct for the flow of material therebetween and also having a scraper blade forming an advance wall of said duct like portion for scraping material from said box, and a strike-off blade forming an opposite wall of said duct like portion and striking off aggregate onto said material receiving box for sampling and having a closure plate extending from said strike-off blade and retaining aggregate from flowing from said supply bin to said measuring bin, said material receiving box having a drop bottom, and a sampling box in material receiving relation with respect to said drop bottom for taking a sample from the aggregate struck off by said strike-off blade.

2. In a bituminous batch plant, aggregate supply and measuring means therefor comprising an aggregate supply bin and an aggregate measuring bin in material receiving relation with respect thereto and disposed therebeneath, a strike-off gate in the space between said bins, scale means supporting said measuring bins for the weighing of material therein, said measuring bin having a movable wall adjustable to vary the volume thereof, and said strike-off gate having a strike-off blade and a closure plate movable to strike-off material in said measuring bin and block the flow of material from said supply to said measuring bin to accommodate weighing the aggregate therein, and said movable wall being movable to afford additional bin space when the weight of the aggregate is short, and support means for said measuring bin manually operable to take the weight of said measuring bin from said scale beams and accommodate measuring by striking off material from the top of said aggregate bin and blocking the flow of material from said supply to said aggregate measuring bin.

3. In a bituminous batch plant aggregate supply and measuring means therefor comprising an aggregate supply bin and an aggregate measuring bin spaced vertically therefrom in material receiving relation with respect thereto, a strike-off gate in the space between said bins, said strike-off gate having an advance open portion forming a duct for the flow of material from said supply to said measuring bin, an advance wall of which forms a scraper blade and an opposite wall of which forms a strike-off blade, and also having a closure plate extending rearwardly from said strike-off blade for blocking the flow of material from said supply to said measuring bin during the strike-off operation, a tilt box pivotally supported in spaced relation with respect to said measuring bin adjacent one of its ends and resting on said measuring bin adjacent its opposite ends and having a drop bottom, said tilt box forming a guide for said strike-off gate, said scraper blade scraping loose material therefrom and said strike-off blade depositing a sample of loose material thereon for sampling, an engaging connection between said scraper blade and said tilt box for tilting the same out of engagement with said measuring bin at the termination of a strike-off operation and means releasing said drop bottom to obtain a supply of aggregate for sampling.

4. In a bituminous batch plant, aggregate supply and measuring means therefor comprising an aggregate supply bin and an aggregate measuring bin in material receiving relation with respect thereto, the discharge and receiving ends of said bins being vertically spaced with respect to each other, and a strike-off gate guided for movement in the space between said bins, a tilt box pivotally connected to said supply bin in outwardly spaced relation with respect thereto and resting on said measuring bin, scale means for supporting said measuring bin for weighing the aggregate therein, said strike-off gate having an open duct like portion, an advance wall of which forms a scraper blade movable within said tilt box for scraping aggregate therefrom and an opposite wall of which forms a strike-off blade for striking off aggregate from said measuring bin into said tilt box, and also having a closure plate extending rearwardly from said strike-off blade for blocking the flow of material from said supply to said measuring bins, power means for moving said strike-off gate transversely of said bins, and engaging means on said scraper blade engageable with said tilt box above the pivotal axis thereof for tilting said tilt box out of engagement with said measuring bin to remove the weight thereof from said measuring bin to accommodate weighing the aggregate therein.

5. In a bituminous batch plant, aggregate supply and measuring means therefor comprising an aggregate supply bin and an aggregate measuring bin in material receiving relation with respect thereto, the discharge and receiving ends of said bins being vertically spaced with respect to each other, and a strike-off gate guided for movement in the space between said bins, a tilt box pivotally connected to said supply bin in outwardly spaced relation with respect thereto and resting on said measuring bin, scale means for supporting said measuring bin for weighing the aggregate therein, said strike-off gate having an open duct like portion, an advance wall of which forms a scraper blade movable within said tilt box for scraping aggregate therefrom and an opposite wall of which forms a strike-off blade for striking off aggregate from said measuring bin into said tilt box, and also having a closure plate extending rearwardly from said strike-off blade for blocking the flow of material from said supply to said measuring bins, power means for moving said strike-off gate transversely of said bins, and support means for said measuring bin manually operable to remove the weight of said measuring bin from said scale means.

6. In a bituminous batch plant, aggregate supply and measuring means therefor comprising an aggregate supply bin and an aggregate measuring bin in material receiving relation with respect thereto, the discharge and receiving ends of said bins being vertically spaced with respect to each other, and a strike-off gate guided for movement in the space between said bins, a tilt box pivotally connected to said supply bin in outwardly spaced relation with respect thereto and resting on said measuring bin, scale means for supporting said measuring bin for weighing the aggregate therein, said strike-off gate having an open duct like portion, an advance wall of which forms a scraper blade movable within said tilt box for scraping aggregate therefrom and an opposite wall of which forms a strike-off blade for striking off aggregate from said meauring bin into said tilt box, and also having a closure plate extending rearwardly from said strike-off blade for blocking the flow of material from said supply to said measuring bins, power means for moving said strike-off gate transversely of said bins, said measuring bin having a movable wall for varying the volume thereof in accordance with a required weight of material to be measured therein as determined by said scale means, means for adjustably moving said wall and retaining said wall in position, and spaced support means selectively operable to remove the weight of said measuring bin from said scale means, to accommodate measuring of the aggregate by striking off the aggregate therefrom upon the setting of said adjustable wall for a predetermined weight of aggregate.

7. A measuring bin for aggregate and the like comprising a hopper having a material receiving opening at the top thereof and having a drop bottom, said hopper diverging from the material receiving end thereof and having parallel spaced end walls, a side wall connecting said end walls together and extending at a diverging angle with respect to the material receiving end of said hopper and having an opposite pivoted wall movable about a transverse axis disposed adjacent said material receiving opening, to vary the volumetric capacity of said hopper, means for adjusting the position of said pivoted wall with respect to said diverging wall to vary the volumetric capacity of the hopper comprising an arcuate rack secured to said pivoted wall adjacent the lower end thereof and extending outwardly therefrom between said side walls, a pivoted arm pivoted to at least one of said side walls and having slidable engagement with said rack, a stop on the outer end of said rack engageable with said pivoted arm for effecting opening movement of said pivoted wall upon upward pivotal movement of said arm, power means for moving said arm in position to move said pivoted wall to a wide open position, and an adjustable stop engageable with a fixed abutment between said walls and adjustably movable along said rack and retained in position by the teeth thereof, for varying the position of said pivoted wall with respect to said opposite diverging wall of said hopper.

8. A measuring bin for aggregate and the like comprising a hopper having a material receiving opening at the top thereof and having a drop bottom, said hopper diverging from the material receiving end thereof and having parallel spaced end walls, a side wall connecting said end walls together and extending at a diverging angle with respect to the material receiving end of said hopper and having an opposite pivoted wall movable about a transverse axis disposed adjacent said material receiving opening, to vary the volumetric capacity of said hopper, means for adjusting the position of said pivoted wall with respect to said diverging wall to vary the volumetric capacity of the hopper comprising an arcuate rack secured to said pivoted wall adjacent the lower end thereof and extending outwardly therefrom between said side walls, a pivoted arm pivoted to at least one of said side walls and having slidable engagement with said rack, a stop on the outer end of said rack engageable with said pivoted arm for effecting opening movement of said pivoted wall upon upward pivotal movement of said arm, power means for moving said arm in position to move said pivoted wall to a wide open position, an abutment between said end walls, an adjustable stop on said arcuate rack adjustably movable therealong and engageable with said abutment to limit movement of said pivoted wall towards said opposite diverging wall and comprising a stop member guided for movement along said rack and a worm engageable with the teeth of said rack and rotatable to vary the position of said stop with respect to said rack.

9. In a bituminous batch plant, aggregate supply and measuring means therefor comprising a plurality of aggregate supply bins arranged in side by side relation with respect to each other and having downwardly opening discharge ends, strike-off gates disposed beneath the discharge ends of the supply bins and each having an open portion accommodating the flow of aggregate from a supply bin and a closure plate closing off the flow of aggregate from said supply bin, a weigh hopper supported beneath said supply bins and having plurality of compartments, each forming a measuring bin in material receiving relation with respect to an associated supply bin, scale means supporting said weigh hopper for weighing the aggregate in said measuring bins, each of said compartments having a movable side wall movable to vary the volumetric capacity thereof in accordance with a predetermined required weight of aggregate to be contained therein, power means operable to open said side walls to a wide open position, and other means independently operable to limit closing movement of said side walls to vary the volumetric capacity of said bins.

10. In a bituminous batch plant, aggregate supply and measuring means therefor comprising a plurality of aggregate supply bins arranged in side by side relation with respect to each other and having downwardly opening discharged ends, strike-off gates disposed beneath the discharge ends of said supply bins and each having an open portion accommodating the flow of aggregate from a supply bin and a closure plate closing off the flow of aggregate from said supply bin, a weigh hopper beneath said supply bins and having plurality of compartments each forming a measuring bin in material receiving relation with respect to an associated supply bin, scale means supporting said weigh hopper for weighing the aggregate in said measuring bins, each of said compartments having a movable side wall movable to vary the volumetric capacity thereof in accordance with a predetermined required weight of aggregate to be contained therein, power means operable to open said side walls to wide open positions, and support means for said weigh hopper selectively operable to remove the weight of said weigh hopper from said scale means and accommodate volumetric measuring of given weights of aggregate in accordance with the position of said movable side walls of said compartments, by striking off aggregate from the tops of said compartments.

11. In a bituminous batch plant, aggregate supply and measuring means therefor comprising a plurality of aggregate supply bins arranged in side by side relation with respect to each other and having downwardly opening discharge ends, strike-off gates disposed beneath the discharge ends of the supply bins and each having an open portion accommodating the flow of aggregate from a supply bin and a closure plate closing off the flow of aggregate from said supply bin, a weigh hopper supported beneath said supply bins and having a plurality of compartments, each forming a measuring bin in material receiving relation with respect to an associated supply bin, scale means supporting said weigh hopper for weighing the aggregate in said measuring bins, each of said compartments having a movable side wall movable to vary the volumetric capacity thereof in accordance with a predetermined required weight of aggregate to be contained therein, power means operable to open said side walls to wide open positions, comprising a fluid operated cylinder and piston, a pivoted arm pivotally moved thereby, an arcuate arm extending from each of said movable side walls and slidably engaged by said arm, stop means on said arcuate arms engaged by said pivoted arms for moving said movable walls to wide open positions upon movement of said pivoted arm in an upward direction, and other means on said arcuate arms, adjustably movable therealong to limit movement of said movable walls in a closing direction.

12. In a bituminous batch plant, aggregate supply and measuring means therefor comprising a plurality of aggregate supply bins arranged in side by side relation with respect to each other and having downwardly opening discharge ends, strike-off gates disposed beneath the discharge ends of the supply bins and each having an open portion accommodating the flow of aggregate from a supply bin and closure plate closing off the flow of aggregate from said supply bin, a weigh hopper supported beneath said supply bins and having a plurality of compartments each forming a measuring bin in material receiving relation with respect to an associated supply bin, scale means supporting said weigh hopper for weighing the aggregate in said measuring bins, each of said compartments having a movable side wall movable to vary the volumetric capacity thereof in accordance with a predetermined required weight of aggregate to be contained therein, power means operable to open said side walls to wide open positions, and a drop bottom for said hopper for simultaneously discharging aggregate from said measuring bins.

13. In a bituminous batch plant, aggregate supply and measuring means therefor comprising a plurality of aggregate supply bins arranged in side by side relation with respect to each other and having downwardly opening discharge ends, strike-off gates disposed beneath the discharge ends of the supply bins and having open portions accommodating the flow of aggregate from said supply bins and closure plates closing off the flow of aggregate from said supply bins, a weigh hopper supported beneath said supply bins and having plurality of compartments each forming a measuring bin in material receiving relation with respect to an associated supply bin, scale means supporting said weigh hopper for weighing the aggregate in said measuring bins, each of said compartments having a movable side wall movable to vary the volumetric capacity thereof in accordance with a predetermined required weight of aggregate to be contained therein, power means operable to open said side walls to wide open positions, a drop bottom for said hopper, power means for operating said bottom to simultaneously discharge aggregate from said measuring bins, spaced support beams extending each side of said weigh hopper, suspension means for said beams, and means operable to shorten said suspension means to support said weigh hopper on said beams independently of said scale means.

14. In a bituminous batch plant, aggregate supply means, a strike-off gate movable transversely of said aggregate supply means, said strike-off gate having an open duct-like portion in material receiving relation with respect to said aggregate supply means and forming a duct for the flow of a column of material from said aggregate supply means, a material receiving plate spaced to one side of said strike-off gate, said strike-off gate having a scraper blade forming an advance wall of said duct-like portion for scraping material from said plate, a strike-off blade forming an opposite wall of said duct-like portion, and a closure plate extending horizontally from said strike-off blade in an opposite direction from said material receiving plate and retaining aggregate from flowing from said supply means upon movement of said strike-off blade to strike-off a section of a column of aggregate onto said material receiving plate for sampling.

15. In a bituminous batch plant, aggregate supply means, a strike-off gate movable transversely of said aggregate supply means, power means for operating said strike-off gate, said strike-off gate having an open duct-like portion in material receiving relation with respect to said aggregate supply means and forming a duct for the flow of a column of material from said aggregate supply means, a material receiving box forming a guide for said strike-off gate and guiding said strike-off gate for movement therealong, said strike-off gate having a scraper blade forming an advance wall of said duct-like portion for scraping material from said material receiving box, a strike-off blade forming an opposite wall of said duct-like portion, a closure plate extending horizontally from said strike-off blade in an opposite direction from said material receiving box and retaining aggregate from flowing from said supply means upon movement of said strike-off blade to strike off a section of a column of aggregate onto said material receiving box for sampling, said material receiving box having a drop bottom, and a sampling box in material receiving relation with respect to said drop bottom for taking a sample from the aggregate struck-off by said strike-off blade.

16. In a bituminous batch plant, aggregate supply and measuring means therefor comprising an aggregate supply bin and an aggregate measuring bin in material receiving relation with respect thereto, the discharge and receiving ends of said bins being vertically spaced with respect to each other, and a strike-off gate guided for movement in the space between said bins, a tilt box pivotally connected to said supply bin in outwardly spaced relation with respect thereto and resting on said measuring bin, scale means for supporting said measuring bin for weighing the aggregate therein, said strike-off gate having an open duct-like portion, an advance wall of which forms a scraper blade movable within said tilt box for scraping aggregate therefrom and an opposite wall of which forms a strike-off blade for striking off aggregate from said measuring bin into said tilt box, and also having a closure plate extending rearwardly from said strike-off blade for blocking the flow of material from said supply to said measuring bins, power means for moving said strike-off gate transversely of said bins, said tilt box having a drop bottom receiving the aggregate struck-off from said measuring bin, a sampling box detachably mounted beneath said drop bottom, and latch means for releasing said drop bottom to guide aggregate into said sampling box for sampling.

References Cited in the file of this patent
UNITED STATES PATENTS

| Number | Name | Date |
| --- | --- | --- |
| 353,388 | Warner | Nov. 30, 1886 |
| 976,069 | Grissom | Nov. 15, 1910 |
| 1,063,494 | Bardill | June 3, 1913 |
| 1,297,595 | Riley | Mar. 18, 1919 |
| 1,647,703 | Johns | Nov. 1, 1927 |
| 1,980,057 | Horkavi | Nov. 6, 1934 |
| 2,037,688 | Brady | Apr. 14, 1936 |
| 2,373,831 | Howard | Apr. 17, 1945 |
| 2,525,225 | Karlovich | Oct. 10, 1950 |